(12) United States Patent
Noone et al.

(10) Patent No.: US 6,634,389 B2
(45) Date of Patent: Oct. 21, 2003

(54) MULTI-LAYER FUEL AND VAPOR TUBE

(75) Inventors: David L. Noone, Southfield, MI (US); Frank L. Mitchell, Rochester, MI (US)

(73) Assignee: ITT Industries, Inc., White Plains, NY (US)

(*) Notice: Subject to any disclaimer, the term of this patent is extended or adjusted under 35 U.S.C. 154(b) by 0 days.

(21) Appl. No.: 09/879,538

(22) Filed: Jun. 12, 2001

(65) Prior Publication Data

US 2001/0042569 A1 Nov. 22, 2001

Related U.S. Application Data

(63) Continuation of application No. 07/897,304, filed on Jun. 11, 1992, now Pat. No. 6,321,795.

(51) Int. Cl.[7] .................................................. F16L 11/00
(52) U.S. Cl. ................. 138/137; 138/141; 138/DIG. 1; 138/DIG. 7
(58) Field of Search ................................. 138/103, 137, 138/141, 124, 125, 126, 127, 138, 140, 177, DIG. 1, DIG. 7; 428/36.91; 361/215

(56) References Cited

U.S. PATENT DOCUMENTS

| | | | | |
|---|---|---|---|---|
| 3,561,493 A | * | 2/1971 | Maillard et al. | 138/137 |
| 3,584,656 A | * | 6/1971 | Van Assendelet et al. | 138/141 |
| 4,101,699 A | * | 7/1978 | Stine et al. | 138/DIG. 7 |
| 4,870,995 A | * | 10/1989 | Igarashi et al. | 138/125 |
| 5,203,379 A | * | 4/1993 | Holoubek et al. | 138/109 |
| 5,258,213 A | * | 11/1993 | Mugge et al. | 428/36.91 |
| 5,324,557 A | * | 6/1994 | Lupke | 428/36.5 |
| 5,404,915 A | * | 4/1995 | Mügge et al. | 138/141 |
| 5,425,817 A | * | 6/1995 | Mügge et al. | 138/137 |
| 5,437,311 A | * | 8/1995 | Reynolds | 138/137 |
| 5,449,024 A | * | 9/1995 | Rober et al. | 138/137 |
| 5,476,120 A | * | 12/1995 | Brunnhofer | 138/137 |
| 5,524,673 A | * | 6/1996 | Noone et al. | 138/137 |
| 5,884,671 A | * | 3/1999 | Noone et al. | 138/137 |
| 5,884,672 A | * | 3/1999 | Noone et al. | 138/137 |
| 5,937,911 A | * | 8/1999 | Kodama et al. | 138/137 |
| 6,230,749 B1 | * | 5/2001 | Kertesz | 138/137 |
| 6,378,562 B1 | * | 4/2002 | Noone et al. | 138/137 |

* cited by examiner

*Primary Examiner*—James Hook
(74) *Attorney, Agent, or Firm*—Young & Basile, P.C.

(57) ABSTRACT

A layered tubing for use in a motor vehicle composed of a thick outer tubing having an inner and an outer face, the outer tubing made of an extrudable thermoplastic such as a polyamide like Nylon 12; a thin intermediate bonding layer bonded to the inner face of the thick outer layer, the bonding layer composed of an extrudable melt-processible thermoplastic such as poly butylene terepthalate capable of sufficiently permanent laminar adhesion to the polyamide outer tubing; and an inner layer bonded to the intermediate bonding layer, the inner layer composed of an extrudable, melt-processible thermoplastic such as Nylon 12.

19 Claims, 1 Drawing Sheet

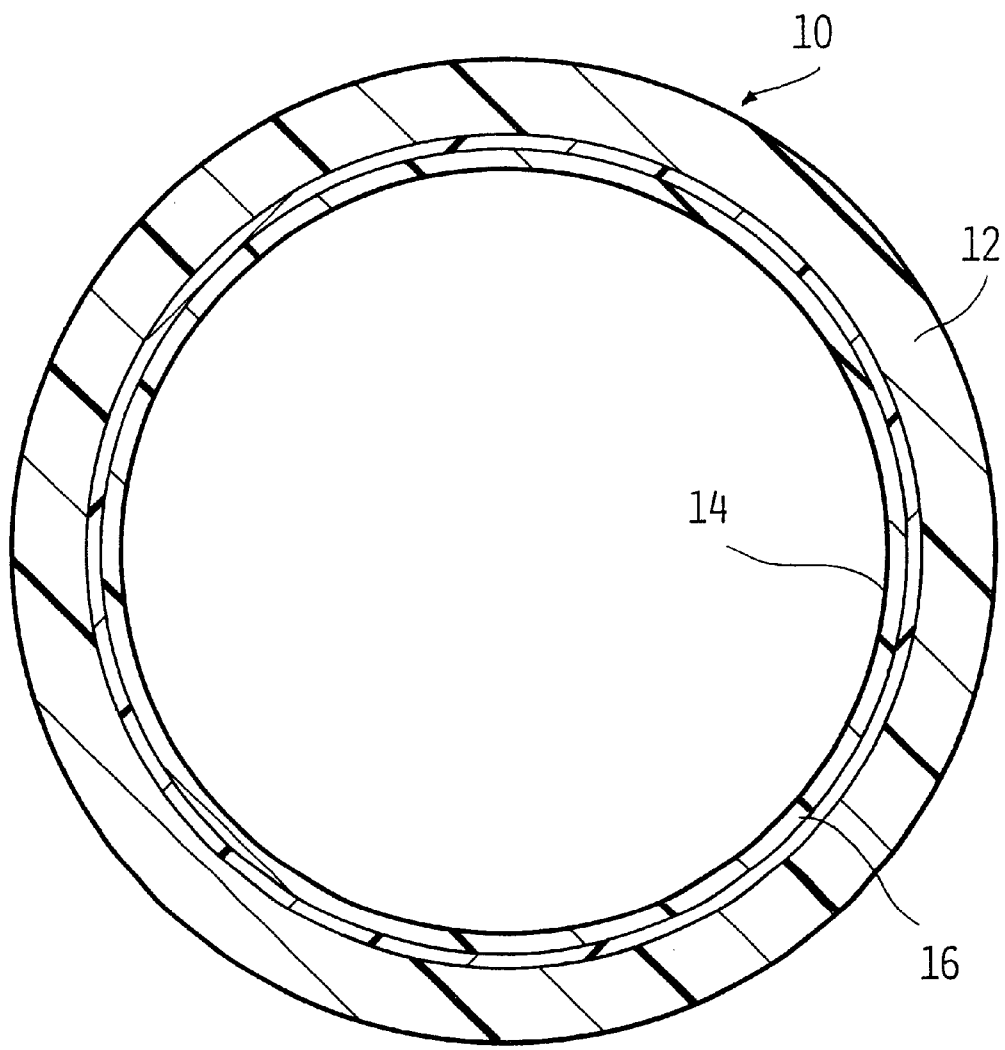

MULTI-LAYER FUEL AND VAPOR TUBE

I. RELATED APPLICATION

This application is a continuation of Ser. No. 07/897,304, filed Jun. 11, 1992 and currently pending before the United States Patent and Trademark Office which has issued as U.S. Pat. No. 6,321,795 on Nov. 27, 2001.

II. FIELD OF THE INVENTION

The present invention relates to a hose for use in a motor vehicle. More particularly, the present invention relates to a multi-layer hose which can be employed as a fuel line or vapor recovery line in a motor vehicle.

III. BACKGROUND OF THE INVENTION

Single layer fuel lines and vapor return lines of synthetic materials such as polyamides have been proposed and employed in the past. Fuel lines employing such materials generally have lengths of at least several meters. It is important that the line, once installed, not materially change during the length of operation, either by shrinkage or elongation or as a result of the stresses to which the line may be subject during use.

It is also becoming increasingly important that the lines employed be essentially impervious to hydrocarbon emissions due to permeation through the tubing. It is anticipated that future Federal and state regulations will fix the limit for permissible hydrocarbon emissions due to permeation through such lines. Regulations which will be enacted in states such as California will fix the total passive hydrocarbon emission for a vehicle at 2 $g/m^2$ per 24 hour period as calculated by evaporative emission testing methods such as those outlined in Title 13 of the California Code of Regulations, section 1976, proposed amendment of Sep. 26, 1991. To achieve the desired total vehicle emission levels, a hydrocarbon permeation level for the lines equal to or below 0.5 $g/m^2$ per 24 hour period would be required.

Finally, it is also imperative that the fuel line employed be impervious to interaction with corrosive materials present in the fuel such as oxidative agents and surfactants as well as additives such as ethanol and methanol.

Various types of tubing have been proposed to address these concerns. In general, the most successful of these have been co-extruded multi-layer tubing which employ a relatively thick outer layer composed of a material resistant to the exterior environment. The innermost layer is thinner and is composed of a material which is chosen for its ability to block diffusion of materials such as aliphatic hydrocarbons, alcohols and other materials present in fuel blends, to the outer layer. The materials of choice for the inner layer are polyamides such as Nylon 6, Nylon 6.6, Nylon 11, and Nylon 12.

Alcohol and aromatics in the fluid conveyed through the tubing diffuse through the tubing wall at rates which differ significantly from the aliphatic components of the fluid being conveyed. The resulting change in the composition of the liquid in the tubing can change the solubility thresholds of the material so as, for example, to be able to crystalize monomers and oligomers of materials such as Nylon 11 and Nylon 12 into the liquid. The presence of copper ions, which can be picked up from the fuel pump, accelerates this crystallization. The crystallized precipitate can block filters and fuel injectors and collect to limit travel of the fuel-pump or carburetor float as well as building up on critical control surfaces of the fuel pump.

In U.S. Pat. No. 5,076,329 to Brunnhofer, a five-layer fuel line is proposed which is composed of a thick outer layer formed of Nylon 11 or Nylon 12, a thick intermediate layer of Nylon 6, and a thin intermediate bonding layer between and bonded to the intermediate and outer layers formed of a polyethylene or a polypropylene. On the interior of the tube is an inner layer of Nylon 6 with a thin intermediate solvent-blocking layer formed of an ethylene-vinyl alcohol copolymer transposed between. The use of Nylon 6 in the inner fluid contacting surface is designed to eliminate at least a portion of the monomer and oligomer dissolution which occurs with Nylon 11 or Nylon 12.

In U.S. Pat. No. 5,038,833 to Brunnhofer, a three-layer fuel line is proposed in which a tube is formed having a co-extruded outer wall of Nylon 11 or Nylon 12, an intermediate alcohol barrier wall formed from an ethylene-vinyl alcohol copolymer, and an inner water-blocking wall formed from a polyamide such as Nylon 11 or Nylon 12. In DE 40 06 870, a fuel line is proposed in which an intermediate solvent barrier layer is formed of unmodified Nylon 6.6 either separately or in combination with blends of polyamide elastomers. The internal layer is also composed of polyamides; preferably modified or unmodified Nylon 6 while the outer layer is composed of either Nylon 6 or Nylon 12.

Another tubing designed to be resistant to alcoholic media is disclosed in UK Application Number 2 204 376 A in which a tube is produced which has an thick outer layer composed of polyamides such as Nylon 6 or 6.6 and/or Nylon 11 or 12 which are co-extruded with an alcohol-resistant polyolefin, a co-polymer of propylene and maleic acid.

Heretofore it has been extremely difficult to obtain satisfactory lamination characteristics between dissimilar polymer layers. Thus all of the multi-layer tubing proposed previously has employed polyamide-based materials in most or all of the multiple layers. While many more effective solvent-resistant chemicals exist, their use in this area is limited due to limited elongation properties, strength and compatibility with Nylon 11 and 12. Additionally, the previous disclosures fail to address or appreciate the phenomenon of electrostatic discharge.

Electrostatic discharge can be defined as the release of electric charge built up or derived from the passage of charged particles through a medium or conduit composed of essentially non-conductive materials. The electrostatic charge is repeatedly replenished with the passage of additional volumes of fuel through a given non-conductive conduit. Discharge repeatedly occurs in the same localized area gradually eroding the area and leading to eventual rupture. This, in turn, leads to the danger of fire and explosion of flammable contents of the tubing.

Thus it would be desirable to provide a tubing material which could be employed in motor vehicles which would be durable and prevent or reduce permeation of organic materials therethrough. It would also be desirable to provide a tubing material which would be essentially nonreactive with components of the liquid being conveyed therein. Finally, it would be desirable to provide a tubing material which can easily be rendered capable of preventing the build-up of electrostatic discharge either in an operation simultaneous with the tube formation or in a post-processing step or would be capable of safely dissipating any electrostatic charge induced therein.

SUMMARY OF THE INVENTION

The present invention is a multi-layer tube which can be used on motor vehicles for applications such as in a fuel line or a vapor return or recovery line. The tube of the present invention is composed of:

an outer layer having an inner and an outer face, the outer layer consisting essentially of an extrudable melt processible thermoplastic having an elongation value of at least 150% and an ability to withstand impacts of at least 2 ft/lbs at temperatures below about −20° C.;

an intermediate layer bonded to the inner face of the thick outer tubing, the bonding layer consisting essentially of an extrudable melt processible thermoplastic resistant to permeation by short-chain hydrocarbons, the bonding layer consisting of a thermoplastic which is chemically dissimilar to the extrudable thermoplastic employed in the outer tubing and is capable of sufficiently permanent laminar adhesion to the inner face of the thick outer tubing; and an inter or layer composed of an extrudable melt processible thermoplastic which is capable of sufficiently permanent laminar adhesion to the intermediate layer, the thermoplastic material in the interior layer having an elongation value of at east 150% and an ability to withstand impacts of at least 2 ft/lbs below about −20° C., the inner layer having a thickness less than the thickness of the outer tubing.

The tubing of the present invention may also include an optional outer jacket composed of a suitable melt-processible thermoplastic which is either co-extruded or applied in separate processing operation. The thermoplastic material employed in the optional outer jacket may be any suitable material which adds insulative or cushioning properties to the tubing jacket. The outer tubing jacket may also, optionally, be capable of dissipating electrostatic energy, the electrostatic dissipation capacity being in a range between about $10^4$ to $10^9$ ohm/cm$^2$.

DESCRIPTION OF THE DRAWING

The objects, features and advantages of the present invention will become more readily apparent from the following description, reference being made to the following drawing in which the FIGURE is a sectional view through a piece of tubing of the present invention.

DESCRIPTION OF THE PREFERRED EMBODIMENT

The present invention is a multi-layer fuel line and vapor tube which contains one outer and one inner tubing layer and at least one bonding layer interposed therebetween. The tubing of the present invention is, preferably, fabricated by co-extruding given thermoplastic materials in a conventional co-extrusion process. The tubing may either be co-extruded to a suitable length or may be co-extruded in continuous length and cut to fit the given application subsequently. The tubing of the present invention may have an outer diameter up to 50 mm. However, in applications such as fuel lines and vapor recovery systems, outer diameters of up to 2.5 inches are preferred.

The material may have any suitable total wall thickness desired. However, in automotive systems such as those described herein, total wall thicknesses between 0.5 mm and 2 mm are generally employed with wall thicknesses of approximately 0.8 to 1.5 mm being preferred. While it is within the scope of this invention to prepare a tubing material having a plurality of overlaying layers of various thermoplastic materials, the tubing of the present invention generally has a maximum of five layers inclusive of the bonding layers. In the preferred embodiment, the tubing material has three or optionally four inclusive of the optional outer jacket layer.

The tubing 10 of the present invention is a material which is suitable for use in motor vehicles and comprises a relatively thick outer layer 12 which is essentially non-reactive with the external environment and can withstand various shocks, vibrational fatigue, and changes in temperature as well as exposure to various corrosive or degradative compounds to which it would be exposed through the normal course of operation of the motor vehicle.

It is anticipated that both the outer tubing layer 12 as well as any interior layers bonded thereto would be suitable for use at an outer service temperature range between about −40° C. and about 150° C., with a range of −20° C. to 120° C. being preferred. The various layers of tubing are integrally laminated to one another and resistant to delamination throughout the lifetime of the tubing. The tubing thus formed will have a tensile strength of, preferably, no less than 25N per mm$^2$ and an elongation value of at least 150%. The tubing will have a burst strength at 23° C. and 120° C. of at least 20 bar. The multi-layer tubing of the present invention is sufficiently resistant to the degradative effects of exposure to brake fluid, engine oil and peroxides such as those which may be found in or provided by chemical reactions occurring in gasoline.

The outer layer 12 may be composed of any melt-processible extrudable thermoplastic material which is resistant to ultra violet degradation, extreme changes in heat and exposure to environmental hazards such as zinc chloride, and degradation upon contact with engine oil and brake fluid. In general, the exterior layer is selected from the group consisting of 12 carbon block polyamides, 11 carbon block polyamides as well as zinc chloride resistant 6 carbon block polyamides, or thermoplastic elastomers. These thermoplastic elastomers are proprietary compositions and commercially available under tradenames such as SANTOPRENE, KRATON, SARLINK and VICHEM. These materials which compose the outer layer can be present in their unmodified state or can be modified with various plasticizers, flame retardants and the like in manners which would be known to one reasonably skilled in the art.

In the preferred embodiment, a polyamide such as Nylon 12 can be effectively employed. It is anticipated that a thermoplastic such as Nylon 12 may be either modified or unmodified. If modified, it is anticipated that the material will contain various plasticizers as are readily known in the art. In the preferred embodiment, the polyamide will contain up to 17% by composition weight plasticizer; with amounts between about 1% and about 13% being preferred.

The outer layer 12, preferably, has a wall thickness between about 0.5 mm and about 1 mm with a preferred range being between about 0.6 mm and about 0.8 mm. As indicated previously, the material is extruded by conventional co-extrusion methods to any continuous length desired.

The thermoplastic material employed in the inner layer 14 of the present invention is a melt-processible extrudable thermoplastic material resistant to extreme changes in heat and exposure to chemical intervals such as are found in engine oil and brake fluid. The thermoplastic material of choice is, preferably, chemically similar in structure and composition to the thermoplastic material employed in the thick outer layer. As used herein, the term "chemically similar material" is defined as a thermoplastic material selected from the group consisting of 12 carbon block polyamides, 11 carbon block polyamides as well as zinc chloride resistant 6 carbon block polyamides, thermoplastic elastomers and mixtures thereof. The thermoplastic elastomers which can successfully be employed in the tubing of the present invention are proprietary compositions commercially available under tradenames such as SANTOPRENE, KRATON, SARLINKand VICHEM. The thermoplastic material employed in the inner layer of the tubing of the present invention either may be identical to the material employed in the thick outer layer or may be a different thermoplastic selected from those listed to take advantage of specific properties of the various thermoplastics. In the preferred embodiment, the inner layer 14 is composed of a material similar to or identical to the thick outer layer. In the preferred embodiment, a polyamide such as Nylon 12 can be effectively employed.

The thermoplastic employed in the inner layer 14 may be either modified or unmodified. If modified, it is anticipated that the material will contain various plasticizers as are readily known in the art. In the preferred embodiment, the polyamide will contain up to 17% by composition weight plasticizer; with amounts between about 1% and about 13% being preferred.

The inner layer 14 may have a thickness sufficient to supply strength and chemical resistance properties to the multi-layer tubing. Specifically, the inner layer 14 is of sufficient thickness to impede permeation of aliphatic and aromatic hydrocarbon molecules and migration of those molecules through to the thick outer layer. In the present invention, the inner layer has a wall thickness less than that of the thick outer layer. In the preferred embodiment, the inner layer has a wall thickness between about 10% and 25% that of the outer layer; preferably less than between about 0.05 mm and about 0.4 mm; with a wall thickness between about 0.1 mm and about 0.3 mm being preferred.

In order to accomplish effective lamination of the two thermoplastic materials which compose the inner and outer layers, the tubing of the present invention also includes at least one intermediate layer 16 interposed between the two previously described layers and co-extruded therewith which is capable of achieving a suitable homogeneous bond between itself and the two respective layers. The intermediate bonding layer 16 is generally composed of a more elastic material than that employed in the inner layer 14.

In the present invention, the interior bonding layer 16 is a chemically dissimilar, permeation resistant, chemical resistant, fuel resistant thermoplastic material which is melt processible in normal ranges of extrusion, i.e. about 175° to about 250° C. By the term "chemically dissimilar" it is meant that the interior bonding layer 16 is a non-polyamide material which is capable of integral adhesion with and between the thick outer layer 12 and the inner layer 14 as a result of co-extrusion.

The intermediate bonding layer 16 is composed of a thermoplastic material which permits the establishment of a homogeneous bond between the inner and outer layers and exhibits properties of resistance to permeation of aliphatic and aromatic materials such as those found in fuel. The thermoplastic material employed herein is preferably a melt-processible co-extrudable thermoplastic which may or may not contain various plasticizers and other modifying agents.

In the preferred embodiment, the thermoplastic material which comprises the interior bonding layer 16 is a thermoplastic polyester derived from ethylene glycol selected from the group consisting of polybutylene terepthalate, polyethylene terepthalate, polyteremethylene terepthalate, and mixtures thereof. The preferred material is polybutylene terepthalate. Suitable material is commercially available under the tradename 1607 ZE40 from Hüls of Dusseldorf, Germany.

The material may, optionally, be modified to exhibit conductive or static dissipative characteristics such as those described previously, if desired. Thus, the intermediate bonding layer 16 may, optionally, include sufficient amounts of a conductive media to effect electrostatic dissipation in the range of $10^4$ to $10^9$ ohm/cm$^2$. The intermediate bonding layer may be rendered electrostatically conductive by the inclusion of certain conductive material such as those selected from the group consisting of elemental carbon, stainless steel, copper, silver, gold, nickel, silicon and mixtures thereof The thermoplastic material employed in the interior layer 16 also exhibits characteristics which permit resistance to permeation by short chain aromatic and aliphatic compounds. These permeation resistant characteristics synergistically interact with the inner polyamide layer such that the total permeation resistance is unexpectedly increased when the thermoplastic interior layer is bonded to the inner polyamide layer. Thus, the resistance to permeation to short chain aromatic and aliphatic hydrocarbons exhibited by the multi-layer material exceeds the permeation resistance exhibited by individual layers of either polybutylene terepthalate or polyamide of a thickness equal to or greater than the multi-ply composite of the present invention.

In the preferred embodiment, the inner layer 14 and the bonding layer 16 are maintained at the minimum thickness sufficient to prevent permeation of the fuel through the tubing material to the thick outer layer and on through to the outer environment. It is preferred that the amount of hydrocarbon permeation through the tubing of the present invention be no greater than 0.5 grams per meter squared in a 24 hour interval. It is anticipated that the thickness of both the inner and intermediate layers can be modified to accomplish this end. In the preferred embodiment, the inner layer has a thickness between about 0.05 mm and about 0.2 mm with a thickness of about 0.1 mm to about 0.2 mm being preferred. The intermediate bonding layer generally has a thickness less than or equal to that of the inner layer. In general, the intermediate bonding layer has a thickness between about 0.05 mm and about 0.2 mm with a thickness between about 0.1 mm and about 0.2 mm being preferred.

The total wall thickness of the tubing of the present invention is generally between about 0.5 mm and about 2.0 mm with a wall thickness between about 0.8 and about 1.25 mm being preferred.

The tubing of the present invention may also, optionally include an outer jacket layer (not shown) which surrounds the outer layer. The fourth outer jacket layer may be either co-extruded with the other layers during the extrusion process or may be put on in a subsequent process such as cross-extrusion. The outer jacket may be made of any material chosen for its structural or insulative characteristics and may be of any suitable wall thickness. In the preferred embodiment, the outer jacket may be made of a thermoplastic material selected from the group consisting of zinc-chloride resistant Nylon 6, Nylon 11, Nylon 12, polypropylene, and thermoplastic elastomers such as SANTOPRENE, KRATON, VICHEM and SARLINK. If desired, these materials may be modified to include flame retardants, plasticizers and the like.

The outer jacket may, preferably, exhibit conductive characteristics in that it is capable of dissipation of electrostatic charge in the range of $10^4$ to $10^9$ ohm/cm$^2$. The material which composes the outer jacket may be inherently conductive in these ranges or, preferably, includes in its composition a conductive media in sufficient quantity to permit electrostatic dissipation in the range defined. The conductive media may be any suitable material of a composition and shape capable of effecting this static dissipation. The conductive material may be selected from the group consisting of elemental carbon, stainless steel and highly conductive metals such as copper silver, gold, nickel, silicon and mixtures thereof The term "elemental carbon" as used herein is employed to describe and include materials commonly referred to as "carbon black". The carbon black can be present in the form of carbon fibers, powders, spheres, and the like.

The amount of conductive material contained in the outer jacket is generally limited by considerations of low temperature durability and resistance to the degradative effects of the gasoline or fuel passing through the tubing. In the preferred embodiment, the thermoplastic material contains conductive material in an amount sufficient to effect electrostatic dissipation. However, the maximum amount employed therein is preferably less than 5% by volume.

The conductive material can either be interstitially integrated into the crystalline structure of the polymer or can be co-polymerized therewith. Without being bound to any theory, it is believed that carbon-containing materials such as carbon black may be subject to carbon co-polymerization with the surrounding thermoplastic material. Material such as stainless steel are more likely to be interstitially integrated into the crystalline structure of the polymer.

What is claimed is:

1. A layered tubing for conveying a vapor or liquid, the layered tubing comprising:
    an outer layer having an inner and an outer face and a thickness, the outer layer consisting essentially of an extrudable thermoplastic selected from the group including polyanude, thermoplastic elastomers and mixtures of polyamide and thermoplastic elastomers;
    an intermediate layer connected to the inner face of the outer layer, the intermediate layer consisting essentially of an extrudable melt processible thermoplastic which is chemically dissimilar to the extrudable thermoplastic employed in the outer layer; and
    an intermediate layer having a thickness less than the thickness of the outer layer, the interior layer bonded to the intermediate layer, the interior layer consisting of an extrudable, melt-processible thermoplastic which is chemically dissimilar to the thermoplastic employed in the intermediate layer;
    wherein the material employed in the interior, outer and intermediate layers are thermoplastic materials when the tubing is in a use condition.

2. The tubing of claim 1 wherein the intermediate bonding layer has a thickness a proximately equivalent to the thickness of the inner layer.

3. The tubing of claim 1 wherein the extrudable thermoplastic of the outer layer is a melt-processible thermoplastic selected from the group consisting of Nylon 11, Nylon 12, zinc chloride resistant Nylon 6, SANTOPRENE, KRATON, VICHEM, SARLINK and mixtures thereof.

4. The tubing of claim 1 wherein the outer tubing comprises:
    an effective amount of a polyamide selected from the group consisting of Nylon 11, Nylon 12, zinc chloride resistant Nylon 6, and mixtures thereof, and
    between about 1 and about 17% by volume of a thermoplastic plasticizer material.

5. The tubing of claim 4 wherein the thermoplastic material employed in the intermediate bonding layer includes as a major constituent an extrudable, melt processible thermoplastic is a thermoplastic polyester selected from the group consisting of polybutylene terephthalate, polyethylene terephthalate, polyteremethylene terephthalate, and mixtures thereof.

6. The tubing of claim 4 wherein the thermoplastic material employed in the intermediate bonding layer consists essentially of polybutylene terephthalate.

7. The tubing of claim 1 wherein the thermoplastic material employed in t e intermediate layer exhibits at least some resistance to interaction with short-chain hydrocarbon molecules present in material conveyed through the tubing.

8. The tubing of claim 1 wherein the extrudable melt-processible thermoplastic of the inner layer is selected from the group consisting of Nylon 11, Nylon 12, zinc chloride, Nylon 6, and mixtures thereof.

9. The tubing of claim 8 wherein the outer layer comprises:
    an effective amount of a polyamide selected from the group consisting of Nylon 11, Nylon 12, Nylon 6, and mixtures thereof; and
    between about 1 and about 17% by volume of a thermoplastic plasticizer material.

10. The tubing of claim 1 further comprising an exterior jacket overlying the thick outer tubing, the exterior jacket composed of a material consisting essentially of a thermoplastic rubber selected from the group consisting of Nylon 11, Nylon 12, zinc chloride resistant Nylon 6, polyether block amides, SANTOPRENE, TON, VICHEM, SARLLNK, and mixtures thereof.

11. A layered tubing for conveying a vapor or liquid, the layered tubing comprising:
    an outer layer having an inner and an outer face, the outer layer consisting essentially an extrudable thermoplastic polyamide;
    an intermediate layer consisting essentially of an extrudable non-polyamide thermoplastic capable of sufficiently permanent laminar adhesion to the polyamide outer layer and exhibiting at least some resistance to short-chain hydrocarbon molecule conveyed through the tubing; and
    an inner layer consisting essentially of an extrudable, melt processible thermoplastic polyamide capable of sufficiently permanent laminar adhesion with the intermediate layer, the inner layer selected from the group consisting of Nylon 11, Nylon 12, Nylon 6, an mixtures thereof,
    wherein the materials employed in the outer layer, inner layer and intermediate layers are thermoplastic when the layered tubing is in a use condition.

12. The tubing of claim 11 wherein the outer tubing comprises:
    an effective amount of a polyamide selected from the group consisting of Nylon 11, Nylon 12 Nylon 6, and mixtures thereof, and
    between about 1 and about 17% by volume of a thermoplastic.

13. The tubing of claim 11 wherein the extrudable thermoplastic of the outer layer is a polyamide selected from the group consisting of Nylon 11, Nylon 12, nylon 6, and mixtures thereof.

14. The tubing of claim 13 further comprising an exterior jacket overlying the outer layer, the exterior jacket composed of a material consisting essentially of a thermoplastic rubber selected from the group consisting of Nylon 11, Nylon 12, Nylon 6, SANTOPRENE, KRATON, VICHEM, SARLINK, polypropylene and mixtures thereof.

15. A layered tubing for conveying a vapor or liquid, the layered tubing comprising:

an outer layer having an inner and an outer face, the outer layer consisting essentially fan extrudable polyamide;

an intermediate layer consisting essentially of an extrudable non-polyamide thermoplastic capable of sufficiently permanent laminar adhesion to the polyamide outer layer and exhibiting at least some resistance to short-chain hydrocarbon molecule conveyed through the tubing, wherein the extrudable thermoplastic of the intermediate layer is a thermoplastic polyester selected from the group consisting of polybutylene terephthalate, polyethylene terephthlate and mixtures thereof, and an intermediate layer consisting essentially of an extrudable, melt processible polyamide capable of sufficiently permanent laminar adhesion with the intermediate layer selected from the group consisting of Nylon 11, Nylon 12, Nylon 6, and mixtures thereof;

wherein the materials employed in the outer layer, inner layer and intermediate layer are thermoplastic when the tubing is in a use condition.

16. A layered tubing for conveying vapor or liquid, the layered tubing comprising:

an inner fled-contacting layer, the inner layer composed of a melt-processible thermoplastic;

an intermediate layer positioned radially outward of the inner fluid contacting layer and in contact therewith, the intermediate layer containing a melt-processible thermoplastic consisting essentially of a thermoplastic material which is chemically dissimilar to the melt-processible thermoplastic employed in the inner fluid-contacting layer;

an outer layer positioned radially outward of the intermediate layer, the outer layer composed of a melt-processible thermoplastic consisting essentially of a thermoplastic which is chemically dissimilar to the melt-processible thermoplastic employed in the inner fluid contacting layer, the melt processible thermoplastic selected from the group consisting of polyantide, thermoplastic elastomers and mixtures thereof, and wherein the inner, intermediate and outer layers are in fixed positional relationship to each other and are composed of thermoplastic material when the layered tubing is in a use condition.

17. The layered tubing of claim 16 wherein the extrudable thermoplastic of the outer layer is a melt-processible thermoplastic selected from the group consisting of Nylon 11, Nylon 12, Nylon 6, SANTOPRENE, KRATON, VICHEM, SARMINK, and mixtures thereof.

18. The tubing of claim 16, wherein the chemically dissimilar thermoplastic material employed in the intermediate layer consists essentially of polybutylene terephthalate, polyethylene terephthalate, and mixtures thereof.

19. The tubing of claim 16 wherein the thermoplastic of the inner layer is selected from the group consisting of Nylon 11, Nylon 12, Nylon 6 and mixtures thereof.

* * * * *